G. M. BACON.
ADJUSTABLE AUTOMATIC CUT-OFF VALVE AND SIGNAL.
APPLICATION FILED NOV. 2, 1916.
1,230,981.
Patented June 26, 1917.
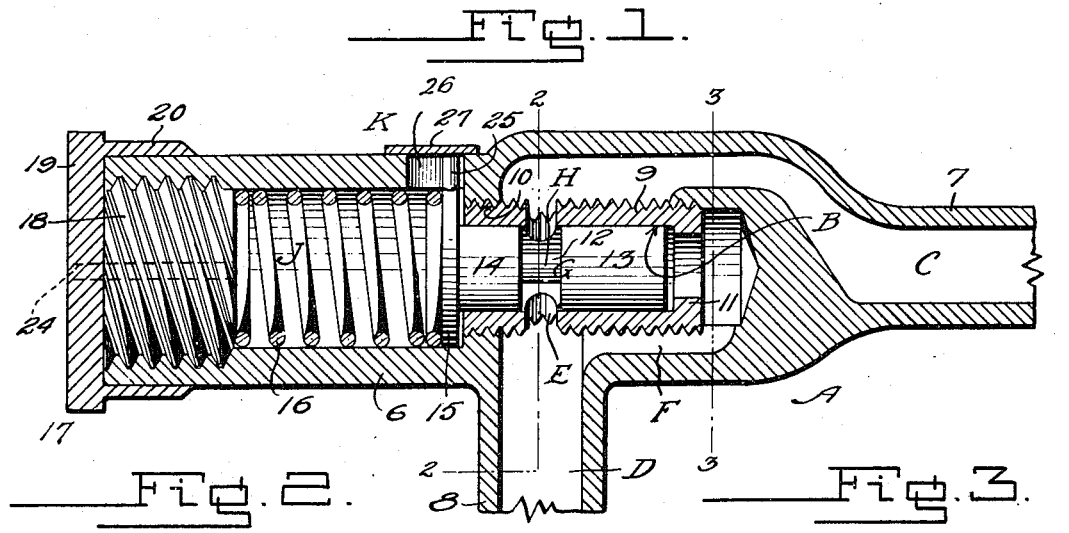
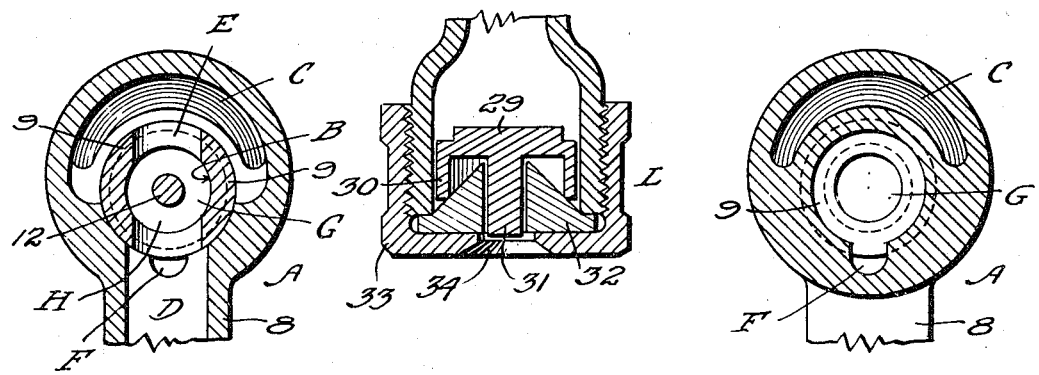
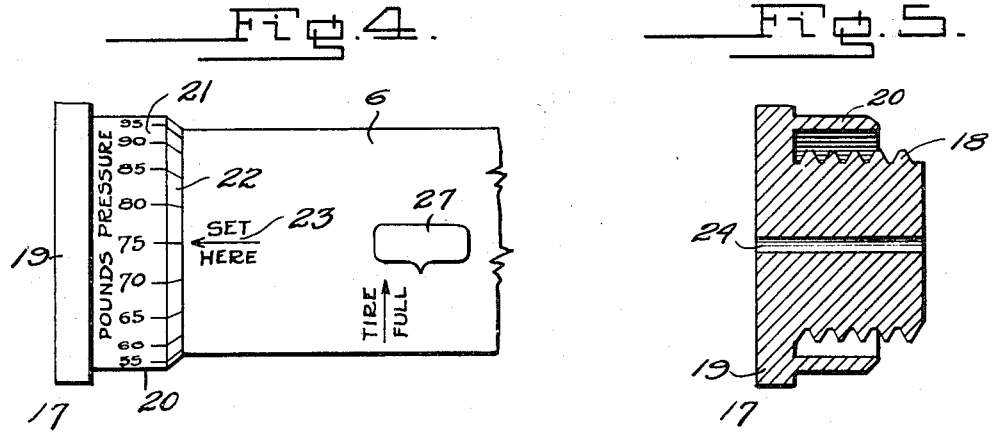
Inventor
George M. Bacon,
By Lancaster and Allwine
his Attorneys

UNITED STATES PATENT OFFICE.

GEORGE M. BACON, OF SALT LAKE CITY, UTAH.

ADJUSTABLE AUTOMATIC CUT-OFF VALVE AND SIGNAL.

1,230,981.  Specification of Letters Patent.  Patented June 26, 1917.

Application filed November 2, 1916. Serial No. 129,175.

*To all whom it may concern:*

Be it known that I, GEORGE M. BACON, a citizen of the United States, and a resident of Salt Lake City, in the county of Salt Lake and State of Utah, have invented a certain new and useful Improvement in an Adjustable Automatic Cut-Off Valve and Signal, of which the following is a specification.

My present invention relates to control devices for lines used in conducting air from supply tanks to the tubes of pneumatic tires.

The principal objects of my invention are, first, to provide control devices which may be adjusted to automatically cut off the supply of air from storage tanks when a predetermined pressure has been attained in pneumatic tires, deriving their source of air from such tanks and through said devices; second, to provide devices of the character described which will visually signal to indicate that the desired pressure has been attained; and, third, to provide devices of the character set forth, which, in action, are independent of any excess pressure in the air lines, thus obviating the necessity of reducing valves at the tanks.

Other objects of my invention are to provide adjustable automatic cut-off valve and signal devices which may be readily installed in the air lines of existing compressed air supply apparatus, without discarding the automatic air connection valves for the tire valves now in common use; and, devices of the character described which are compact, inexpensive to manufacture, readily adjustable, and which may be permanently secured to a support, such as a post, to and from which the air line leads, or which may be portable and disposed closely adjacent the automatic air connection valve at the free end portion of the air hose.

Further objects of my invention will appear in the following detailed description, taken in connection with the accompanying drawing, forming a part of this specification, and in which drawing:—

Figure 1 is a central vertical longitudinal sectional view through an adjustable automatic cut-off valve and signal device, embodying my invention.

Fig. 2 is a sectional view on the line 2—2 of Fig. 1.

Fig. 3 is a sectional view on the line 3—3 of Fig. 1.

Fig. 4 is a fragmentary top plan view of the device.

Fig. 5 is a central vertical sectional view through a member facilitating adjustment.

In the drawings, where similar characters refer to similar parts throughout the views, A designates a housing provided with a bore B, inlet way C, outlet way D, port E for air from way C to way D through bore B, an auxiliary way F between way D and the one end of bore B; G a valve reciprocable in bore B, said valve provided with a by-pass H, intermediate its ends; J adjustable and yieldable means carried by housing A for disposing valve G in one position; and, K a signal device. An air connection valve L of any suitable type, is provided for the control of egress of air from way D, this valve being preferably of that type which permits the air to flow into the tire by pressing the valve against the tire valve.

Referring first to the body A, in the example shown, it is provided with a cylindrical extension 6 co-axial with the bore B, and adapted to support the means J, hereinbefore referred to. The inlet way C and outlet way D may extend through tubular projections 7 and 8, respectively, these projections being preferably at a right angle, the projection 7 to be connected with the air line from a storage tank, (not shown in the drawing). It is preferred to provide the bore B in the form of a detachable externally screw-threaded sleeve 9, forming a part of the body A, this sleeve provided with the port E, affording the only means of communication between the ways C and D. This sleeve may be readily turned into a screw-threaded bore 10, which is co-axial with the extension 6, by passing the sleeve through the hollow of said extension from its end opposite to projection 7. The sleeve 9 is preferably provided with an inwardly disposed annular flange 11, at its end portion adjacent auxiliary way F, to limit the movement of valve G in one direction.

As to the valve G, the by-pass H may be formed by reducing the body of the valve intermediate its ends, providing a neck 12 joining major portion 13 and minor portion 14 of the valve. The valve may also be provided with a disk-like head 15 slidable in the bore of extension 6. The major portion 13 of the valve is guided in that portion of bore B adjacent auxiliary way F while the minor portion 14 is guided by that portion of the bore adjacent the extension 6, the valve being reciprocable so that the major portion 13 may close port E, shutting off communication between ways C and D, as by air pressure in way D and auxiliary way F, acting upon the end portion of valve G.

Referring now to the means J, it may comprise an expansion spring 16 in the bore of extension 6, and acting upon valve G, as by engaging the head 15; and, a head 17 in screw-threaded engagement with extension 6, and adapted to compress spring 16 when turned in one direction, and permit the spring to expand when turned in a counter direction. The head 17 is preferably formed to comprise a multiple-threaded screw 18 in screw-threaded engagement with the interior of extension 6, a disk-like enlargement 19 on screw 18, and an annular flange 20 extending from enlargement 19 and disposed about cylindrical extension 6, this flange being provided on its outer face with delineations 21 representing "pounds pressure", the end portion of the flange being preferably beveled as at 22, and the extension 6 carrying delineations 23 signifying the position at which the head 17 is to be set when it is desired to provide a predetermined number of pounds pressure in the tire, and at which the valve G is to operate, shutting off the source of air supply delivered through way C. The head 17 may be provided with a port 24 preventing compression in the extension 6 as the head 15 of valve G moves toward 17.

The signal device K may comprise a stem 25 extending through an elongated slot 26 in extension 6, said slot extending longitudinally of the extension; and, a plate 27 concealing slot 26 but movable with stem 25, and coöperating with delineations 28 on the extension 6 to indicate that the tire is full to the extent that it contains pressure referred to in the setting of head 17. The stem 25 may be rigid with the head 15 of valve G and movable therewith, and by engaging the ends of slot 26, it may limit the amplitude of reciprocation of the valve G.

The valve L may be of any suitable type, either carried in way D of body A, or attached to the body in any suitable manner, to control egress of air from way D. This valve may comprise a plunger 29 provided with an annular flange 30 and a depending stem 31; a conical-shaped gasket 32 through which the stem 31 extends, the flange 30 to engage said gasket when in its lowermost position; and a cap 33 in screw-threaded engagement with projection 8, and provided with a perforation 34 co-axial with stem 31. By disposing the cap 33 to extend about the tire valve, the stem 31 is forced upwardly, thus lifting the plunger 29 from engagement with the gasket 32, and air in way D may pass about the plunger and through the bore of gasket 32, into the tire.

The operation of the adjustable automatic cut-off valve and signal is as follows:—

Assuming that it is desired to inflate a tire to seventy-five pounds pressure, the head 17 is turned until the delineation 75 is in alinement with the arrow of delineations 23. This places the spring 16 in such a state of compression that when the valve G is forced in a direction toward the head 17 by air pressure in auxiliary way F, it will continue to compress, under the action of valve G, until the port E is closed by a pressure of seventy-five pounds in the auxiliary way F. The operator then places the way D in communication with the pneumatic tire, as by pressing the plunger 29 of valve L out of engagement with the gasket 32. If the pressure in the inner tube is less than seventy-five pounds, it is communicated through ways D and F, and the spring 16 forces valve G toward the flange 11 thereby opening port E through by-pass H and affording communication between the ways C and D. This continues until the air in the inner tube reaches seventy-five pounds pressure, when this pressure is communicated through ways D and F, through the end of valve G and which forces said valve to compress the spring 16 sufficiently to close port E. When the valve G has moved to close port E, the signal device K is actuated to indicate that the tire is full, as hereinbefore described, after which the operator removes the valve L from operative relation to the tire valve.

It is to be observed that the pressure upon the adjacent faces of major and minor portions 13 and 14 of valve G is equalized when the port E is open for communication between ways C and D, so that operation of valve G is independent of any pressure in way C. By adjusting the head 17, the device may be adapted to shut off communication between the ways C and D when any predetermined pressure has been attained in way D, and consequently in the pneumatic tire, obviating the necessity of testing the pressure in the tire after it has been inflated.

Changes in details may be made without departing from the spirit or scope of my invention; but,

I claim:—

1. A control device for air lines comprising in combination, a housing provided with a bore, inlet and outlet ways, a port affording communication between said ways and through said bore, and an auxiliary way between said outlet way and one end of said bore; a valve reciprocable in said bore, said valve provided with a by-pass intermediate its ends and movable in one direction to open its by-pass to said port, and movable in the other direction by air pressure in said auxiliary way and acting upon its one head, to shut off communication through said port; means carried by said housing for yieldably maintaining said valve in an open position, but adjustable to be counteracted by predetermined attained pressure in said auxiliary way; said casing being provided with a longitudinal recess in one wall thereof, and a pin projecting from said valve into the recess to engage the casing at the opposite ends thereof for limiting the amplitude of reciprocation of said valve.

2. A control device for air lines comprising in combination, a housing provided with a bore, inlet and outlet ways, a port affording communication between said ways and through said bore, and an auxiliary way between said outlet way and one end of said bore; a valve reciprocable in said bore, said valve provided with a by-pass intermediate its ends and movable in one direction to open its by-pass to said port, and movable in the other direction by air pressure in said auxiliary way acting upon one head of said valve, to shut off communication through said port; means carried by said housing for yieldingly maintaining said valve in an open position and adjustable to be counteracted by predetermined attained pressure in said auxiliary way; said housing also having a longitudinal slot in one wall and a fixed index on its outer face at one end of the slot, a stem projecting from said valve into said slot for engagement with the housing at the opposite ends thereof to limit the movement of the valve, and an index plate carried upon the outer end of said stem over said slot to cover the same and having an index projection adapted for movement with the valve into registry with the fixed index to indicate the closing of the valve.

3. In a pressure-controlled cut-off valve, the combination of a housing having inlet and outlet portions at substantially right angles to each other and a hollow projection in axial alinement with the inlet portion, a removable bearing sleeve extending inwardly from said projection into the housing, having a stop flange in its inner end, and having a transverse opening communicating the inlet and outlet portions of the housing, a shiftable valve slidably mounted in said sleeve and having a substantially transverse opening therethrough and a head movable in the projection, and tension means arranged in the projection and bearing against said head to normally urge the valve against said stop flange and retain the transverse opening of the valve in register with the opening in the sleeve, said housing having an outlet by-pass leading to the inner end of the sleeve, whereby predetermined pressure in the outlet is adapted to shift said valve against said tension means and move the transverse openings out of register.

4. In a pressure controlled cut-off valve, the combination of a housing having inlet and outlet portions at substantially right angles to each other and a hollow projection in axial alinement with the inlet portion, a valve slidably arranged in the housing and having a transverse opening therethrough adapted to register with the inlet and outlet portions and having one head in communication with the outlet portion, a spring arranged in said projection bearing at one end against the opposite head of the valve to normally urge the same into open position, a cap nut engaging over the outer end of the projection and having a threaded stem part adjustably engaging in the housing and bearing against the opposite end of said spring to tension the latter, and a graduated scale carried upon the peripheral surface of said cap indicating various pressures to be attained in the outlet portion of the housing to overcome the tension of the spring at various adjustments of the cap, said housing being provided with a fixed index on its outer surface adapted to be traversed by said graduated scale of the cap to determine the desired adjustment of the latter.

GEORGE M. BACON.